(12) United States Patent
Nakagawa et al.

(10) Patent No.: US 12,555,657 B2
(45) Date of Patent: Feb. 17, 2026

(54) MEDICAL INFORMATION PROCESSING APPARATUS, RECORDING MEDIUM, MEDICAL INFORMATION PROCESSING SYSTEM, AND MEDICAL INFORMATION PROCESSING METHOD

(71) Applicant: Konica Minolta, Inc., Tokyo (JP)

(72) Inventors: Mayumi Nakagawa, Osaka (JP); Masaki Sunagawa, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 68 days.

(21) Appl. No.: 18/529,418

(22) Filed: Dec. 5, 2023

(65) Prior Publication Data

US 2024/0212813 A1    Jun. 27, 2024

(30) Foreign Application Priority Data

Dec. 27, 2022    (JP) .................. 2022-209310

(51) Int. Cl.
 *G16H 15/00* (2018.01)
 *G16H 30/20* (2018.01)

(52) U.S. Cl.
 CPC ............. *G16H 15/00* (2018.01); *G16H 30/20* (2018.01)

(58) Field of Classification Search
 CPC ........ G16H 15/00; G16H 30/20; G16H 40/20; G06F 16/5838; A61B 6/5294; G01T 1/2985
 See application file for complete search history.

(56) References Cited

U.S. PATENT DOCUMENTS

| | | | | |
|---|---|---|---|---|
| 2008/0226035 | A1* | 9/2008 | Masuda | H05G 1/26 378/145 |
| 2015/0100290 | A1* | 4/2015 | Falt | G09B 23/286 703/2 |
| 2015/0100572 | A1* | 4/2015 | Kalafut | G06F 16/5838 707/736 |
| 2021/0370093 | A1* | 12/2021 | Nomura | G16H 20/40 |
| 2023/0211181 | A1* | 7/2023 | Munier | A61B 6/5294 378/65 |

FOREIGN PATENT DOCUMENTS

| | | |
|---|---|---|
| JP | 3597677 B2 | 12/2004 |
| JP | 2017-209522 A | 11/2017 |
| JP | 6818570 B2 | 1/2021 |
| WO | WO-2019031696 A1 * | 2/2019 |

OTHER PUBLICATIONS

Midgley, Capture and analysis of radiation dose reports for radiology, Oct. 15, 2014, Australasian Physical & Engineering Sciences in Medicine, pp. 805-819. (Year: 2014).*

* cited by examiner

*Primary Examiner* — Christopher L Gilligan
(74) *Attorney, Agent, or Firm* — Osha Bergman Watanabe & Burton LLP (57) ABSTRACT

A medical information processing apparatus includes a hardware processor that: obtains, from a digital imaging and communications in medicine structured report (DICOM-SR), achievement information in information related to a radiation dose of radiation emitted to an examination object; and outputs the achievement information as an irradiation record.

22 Claims, 10 Drawing Sheets

| EXAMINATION DATE | PATIENT ID | GENDER | BIRTH DATE | AGE | RADIOGRAPHIC TECHNOLOGIST'S NAME | RADIOGRAPHY NAME | VOLTAGE | CURRENT | RADIOGRAPHIC TIME PERIOD | mAs VALUE |
|---|---|---|---|---|---|---|---|---|---|---|
| 2020/11/30 | 0000804948 | MALE | 1968/03/02 | 52 | TEST TECHNOLOGIST | LUMBAR, FRONT | 74 | 200 | 100 | 20 |
| | | | | | | LUMBAR, UPRIGHT, SIDE | 96 | 400 | 100 | 40 |
| | | | | | | LUMBAR, ANTEFLEXION | 96 | 400 | 100 | 40 |
| | | | | | | LUMBAR, RETROFLEXION | 96 | 400 | 100 | 40 |
| | | | | | | KNEE JOINT (L), SKYLINE 60 | 68 | 200 | 14 | 2 |
| | | | | | | KNEE JOINT (L), UPRIGHT, FRONT | 56 | 200 | 14 | 2 |
| | | | | | | KNEE JOINT (L), ROSENBERG | 56 | 200 | 22 | 4 |
| | | | | | | KNEE JOINT (L), SIDE | 56 | 200 | 14 | 2 |
| | | | | | | KNEE JOINT (L), UPRIGHT, FRONT | 56 | 200 | 14 | 2 |
| | | | | | | KNEE JOINT (L), UPRIGHT, FRONT | 56 | 200 | 14 | 2 |
| | | | | | | KNEE JOINT (L), ROSENBERG | 56 | 200 | 22 | 4 |
| | | | | | | KNEE JOINT (L), ROSENBERG | 56 | 200 | 22 | 4 |
| | | | | | | KNEE JOINT (L), SIDE | 56 | 200 | 14 | 2 |
| | | | | | | KNEE JOINT (L), SIDE | 56 | 200 | 14 | 2 |
| 2020/11/30 | 0002027498 | FEMALE | 1943/02/15 | 77 | TEST TECHNOLOGIST | ABDOMEN, UPRIGHT, FRONT | 88 | 400 | 32 | 12 |
| | | | | | | ABDOMEN, RECUMBENT, FRONT | 80 | 400 | 20 | 8 |
| 2020/11/30 | 0011706843 | MALE | 1980/10/26 | 40 | TEST TECHNOLOGIST | ABDOMEN, UPRIGHT, KUB | 88 | 400 | 32 | 12 |
| | | | | | | ABDOMEN, RECUMBENT, KUB | 80 | 400 | 22 | 8 |
| 2020/11/30 | 0002528453 | MALE | 1941/10/18 | 79 | TEST TECHNOLOGIST | CHEST, UPRIGHT, FRONT | 120 | 320 | 7 | 2 |
| | | | | | | CHEST (R-L) | 120 | 320 | 25 | 8 |
| 2020/11/30 | 0003728284 | MALE | 1979/11/24 | 41 | TEST TECHNOLOGIST | FIRST FINGER (L) MP JOINT | 55 | 200 | 14 | 2 |
| | | | | | | FIRST FINGER (L) MP JOINT | 55 | 200 | 9 | 1 |
| 2020/11/30 | 0003128147 | FEMALE | 1947/02/17 | 73 | TEST TECHNOLOGIST | CERVICAL SPINE, FRONT | 74 | 200 | 45 | 9 |
| | | | | | | CERVICAL SPINE, SIDE | 74 | 200 | 45 | 9 |
| | | | | | | CERVICAL SPINE, ANTEFLEXION | 74 | 200 | 45 | 9 |

FIG.7

IRRADIATION RECORD

No.

| FILM No. | REIWA, YEAR, MONTH, DAY | | DEPARTMENT | |
|---|---|---|---|---|
| NAME | | MALE · FEMALE | AGE | OUTPATIENT |
| | | | | ADMISSION |
| ADDRESS | | | | |

| INSTRUCTION ITEM | SITE | | | |
|---|---|---|---|---|
| | | | HALF-CUT | |
| | | | LARGE RECTANGLE | |
| | | | CONTINENTAL | |
| | | | QUARTER | |
| | | | SIXTH | |
| | | | EIGHTH | |
| | DIRECTION | | CABINET | |
| | | | 6×6 | |
| | | | CONTRAST ETC. | |
| | SPOT    SIZE    SHEET(S) | | QTY | |
| | POLYSOL SIZE   SHEET(S) | | | |
| | RADIOGRAPHY  TOMOGRAPHY CONTACT  FLUOROSCOPY  TREATMENT | | | |
| | DISTANCE | TUBE VOLTAGE | TUBE CURRENT | TIME | FILTER |
| | cm | KVP | mA | Sec | |
| REMARKS | | DOCTOR'S NAME | | TECHNOLOGIST'S NAME | |

FIG.8

IRRADIATION RECORD  PLAIN RADIOGRAPHY
2022/09/01~2022/09/30

NAME OF DOCTOR IN CHARGE:

DESCRIPTION DATE:

<TARGET RANGE>SEP. 1, 2022 – SEP. 30, 2022
[IRRADIATION RECORD] EXAMINATION TYPE NAME: PLAIN RADIOGRAPHY

| EXAMINATION DATE | PATIENT ID | PATIENT'S NAME IN KANA | GENDER | BIRTH DATE | AGE | OUTPATIENT/ADMISSION | REQUESTING DEPARTMENT | REQUESTING DOCTOR'S NAME | RADIOGRAPHIC TECHNOLOGIST'S NAME | THE NUMBER OF EXPOSURES |
|---|---|---|---|---|---|---|---|---|---|---|
| | | RADIOGRAPHY NAME | CONTRAST/DRUG | | kv | | | mA | msec | cm |
| 2022/09/01 | 0000001312 | PATIENT AKIYOSHI | MALE | 1937/09/01 | 85 | ADMISSION | INTERNAL MEDICINE | 200  STAFF SHIGEKI | 30  200 | STAFF SEIGO  1 |
| | | CHEST, RECUMBENT, FRONT | | | | | | | | |
| 2022/09/01 | 0000119115 | PATIENT RIYOKO | FEMALE | 1922/11/23 | 99 | ADMISSION | INTERNAL MEDICINE | 200  STAFF SHIGEKI | 30  200 | STAFF KEISUKE  1 |
| | | CHEST, RECUMBENT, FRONT | | | | | | | | |
| 2022/09/01 | 0000071458 | PATIENT NAKAKO | FEMALE | 1942/04/01 | 80 | OUTPATIENT | ORTHOPEDICS | 200  STAFF KAZUO | 200  100 | STAFF SEIGO  2 |
| | | BOTH HIP JOINTS, FRONT | | | 70 | | | 200 | 200  100 | 1 |
| | | R-HIP, JOINT AXIAL VIEW | | | | | | | | |
| 2022/09/01 | 0000030490 | PATIENT AKIRA | MALE | 1939/12/22 | 85 | ADMISSION | ORTHOPEDICS | 200  STAFF TORIKARIN | 200  100 | STAFF SEIGO  2 |
| | | BOTH HIP JOINTS, FRONT R-HIP AXIAL VIEW | | | 70 | | | | | |

FIG.9

| IRRADIATION RECORD | | | | | | | | | | | |
|---|---|---|---|---|---|---|---|---|---|---|---|
| | EXAMINATION DATE | PATIENT ID | GENDER | BIRTH DATE | AGE | TECHNOLOGIST'S NAME | RADIOGRAPHY NAME | VOLTAGE | CURRENT | RADIOGRAPHIC TIME PERIOD | mAs VALUE |
| PLANNED VALUE | | | | | | | | | | | |
| ACHIEVEMENT VALUE | | | | | | | | | | | |

FIG.10

MEDICAL INFORMATION PROCESSING APPARATUS, RECORDING MEDIUM, MEDICAL INFORMATION PROCESSING SYSTEM, AND MEDICAL INFORMATION PROCESSING METHOD

CROSS-REFERENCE TO RELATED APPLICATIONS

The entire disclosure of Japanese Patent Application No. 2022-209310 filed on Dec. 27, 2022, including description, claims, drawings and abstract is incorporated herein by reference.

BACKGROUND

Technical Field

The present invention relates to a medical information processing apparatus, a recording medium, a medical information processing system, and a medical information processing method.

Description of Related Art

In a medical field, an examination apparatus (modality) such as a computed tomography (CT) apparatus that irradiates an examination object with radiation, and generates a radiograph as a medical image has been used. An examination using such an examination apparatus requires grasping the dose of radiation used for the examination in order to appropriately manage the exposure dose of radiation.

For example, JP 3597677B discloses that every time of radiography, an X-ray technologist writes radiographic conditions (a tube voltage value, a tube current value, an irradiation time period, and an irradiation distance) on one line of radiographic condition entry fields of a radiography request sheet (irradiation record).

Furthermore, JP 6818570B discloses that a radiology information system (RIS) manages patient information, examination order information, and an irradiation record (e.g., various types of setting information set in a medical image diagnostic apparatus in previous examinations).

Moreover, JP 2017-209522A discloses that examination achievement information is used in the irradiation record. A process by a modality transmitting the examination achievement information to an RIS uses a service class called the modality performed procedure step (MPPS) in the Digital Imaging and Communications in Medicine (DICOM).

However, according to the invention disclosed in JP 3597677B, the radiographic conditions are handwritten in the irradiation record. Accordingly, an input error of the irradiation record possibly occurs. In this case, actually irradiated dose information cannot be correctly grasped.

According to the invention disclosed in JP 6818570B, the dose information described in the irradiation record is various types of setting information set in the medical image diagnostic apparatus during previous examinations, and is possibly inconsistent with the actually irradiated dose information.

The invention disclosed in JP 2017-209522A is for a facility in which an RIS is introduced. Consequently, it is inapplicable to a facility in which no RIS is introduced.

SUMMARY

One or more embodiments of the present invention provide a medical information processing apparatus, a recording medium, a medical information processing system, and a medical information processing method that can more simply and appropriately grasp actually irradiated dose information.

According to an aspect of the present invention, a medical information processing apparatus includes a hardware processor that:
  obtains, from a DICOM structured report (DICOM-SR), achievement information in information related to a radiation dose of radiation emitted to an examination object; and
  outputs the achievement information as an irradiation record.

According to an aspect of the present invention, a recording medium is:
  a non-transitory computer-readable recording medium storing instructions for causing a computer of a medical information processing apparatus to:
  obtain, from a DICOM structured report (DICOM-SR), achievement information in information related to a radiation dose of radiation emitted to an examination object; and
  output the achievement information as an irradiation record.

According to an aspect of the present invention, a medical information processing system includes a hardware processor that:
  obtains, from a DICOM structured report (DICOM-SR), achievement information in information related to a radiation dose of radiation emitted to an examination object; and
  outputs the achievement information as an irradiation record.

According to an aspect of the present invention, a medical information processing method includes:
  causing a hardware processor to: obtain, from a DICOM structured report (DICOM-SR), achievement information in information related to a radiation dose of radiation emitted to an examination object; and
  output the achievement information as an irradiation record.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, embodiments of the present invention will be described with reference to the drawings. However, the scope of the invention is not limited to the disclosed embodiments.

<1. Configuration of Medical Information Processing System>

Figure 1:
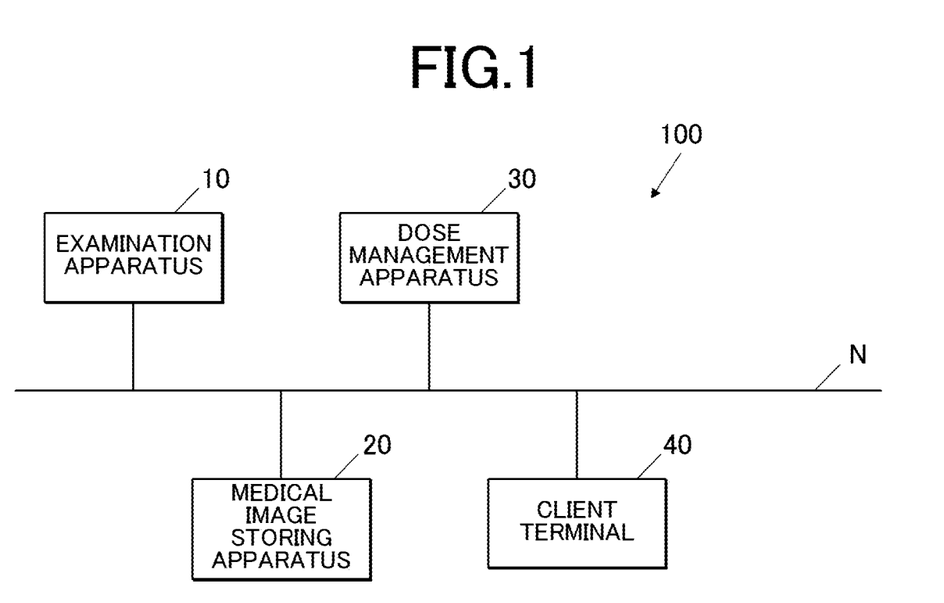
FIG. 1 shows a system configuration example of a medical information processing system.

FIG. 1 shows a system configuration example of a medical information processing system 100.

As shown in FIG. 1, the medical information processing system 100 includes an examination apparatus 10, a medical image storing apparatus 20, a dose management apparatus 30 that is a medical information processing apparatus, and a client terminal 40.

Apparatuses constituting the medical information processing system 100 are connected to allow data transmission and reception via a communication network N, such as a local area network (LAN) and a wide area network (WAN).

The apparatuses that constitute the medical information processing system 100 conform to any of the Health Level Seven (HL7) and DICOM standards. Communication between the apparatuses is performed in conformity with HL7 or the DCOM.

Note that the medical information processing system 100 may include a plurality of examination apparatuses 10, and a plurality of client terminals 40.

<1-1. Examination Apparatus>

The examination apparatus 10 is any of modalities, such as a CT apparatus, an X-ray imaging apparatus (digital radiography (DR)) (general radiography), a computed radiography/digital X-ray (CR/DX) (general radiography), a radiographic fluoroscopy (RF), and an X-ray angiography (XA).

The examination apparatus 10 operates in accordance with operation by an operator to a console, not shown.

The examination apparatus 10 irradiates a patient (an examination subject or an examination object) with radiation, and generates image data of a radiograph (e.g., a CT image) as a medical image, based on a detection result of the radiation.

The examination apparatus 10 attaches supplementary information to the radiograph in conformity with the DICOM standard. The supplementary information includes patient information, examination information, series information, and image information.

The patient information is information about a patient. The patient information includes a patient ID, a patient's name, a birth date, a gender, a height, a weight, an age, and a BMI. The patient ID is identification information for identifying the patient.

The examination information is information about an examination. The examination information includes an examination ID, an examination date, an examination time, an examination description, and an examination instance UID. The examination instance UID is identification information for identifying an examination, and its uniqueness is secured by the DICOM standard.

The series information is information about a series. The series information includes a series instance UID, a series number, a series date, a series time, a modality (CT, DR, CR/DX, RF, XA, etc.), and a series description. The series instance UID is identification information for identifying a series, and its uniqueness is secured by the DICOM standard.

The image information is information about an image. The image information includes an SOP instance UID, an image date, an image time, and an image number. The SOP instance UID is identification information for identifying a radiograph, and its uniqueness is secured by the DICOM standard. The image number is a number indicating the radiographic sequential order of a tomographic image (CT image) generated by one scan.

The examination apparatus 10 generates a radiation dose structured report (RDSR) that includes information related to the radiation dose pertaining to an examination performed in the examination apparatus 10. The examination apparatus 10 transmits image data and an RDSR of a generated radiograph, to the medical image storing apparatus 20 and the dose management apparatus 30.

The RDSR is information in conformity with the DICOM standard, and is one of data formats of data that includes information related to the radiation dose of radiation.

The information related to the radiation dose is information related to the radiation dose (amount of energy) of radiation emitted to the examination object in a radiation examination. The information related to the radiation dose includes not only an indicator representing the radiation dose, such as air kerma [Gy], but also information on quantities having correlation with the radiation dose, such as a voltage applied for irradiation with radiation, a current, a radiation irradiation time period, an irradiation duration, a distance between a radiation source and a detector, total air kerma, the total number of times of irradiation, a dose-area product, a total dose-area product, a dose length product (DLP) that is a product between a CT scan length in a CT examination and an exposure dose, and radiographic conditions. According to the RDSR, such information related to the radiation dose is managed on an examination-by-examination basis.

The examination apparatus 10 generates the RDSR, for every irradiation event that is an aggregation of irradiation operations of radiation emitted to the examination object.

<1-2. Medical Image Storing Apparatus>

The medical image storing apparatus 20 stores and manages image data of radiographs generated by the examination apparatus 10, and information related to the radiation dose included in the RDSR, with respect to each patient and each examination. Examples of the medical image storing apparatus 20 can include a picture archiving and communication system (PACS).

<1-3. Dose Management Apparatus>

The dose management apparatus 30 is a computer apparatus that manages the information related to the radiation dose for the radiograph.

Figure 2:
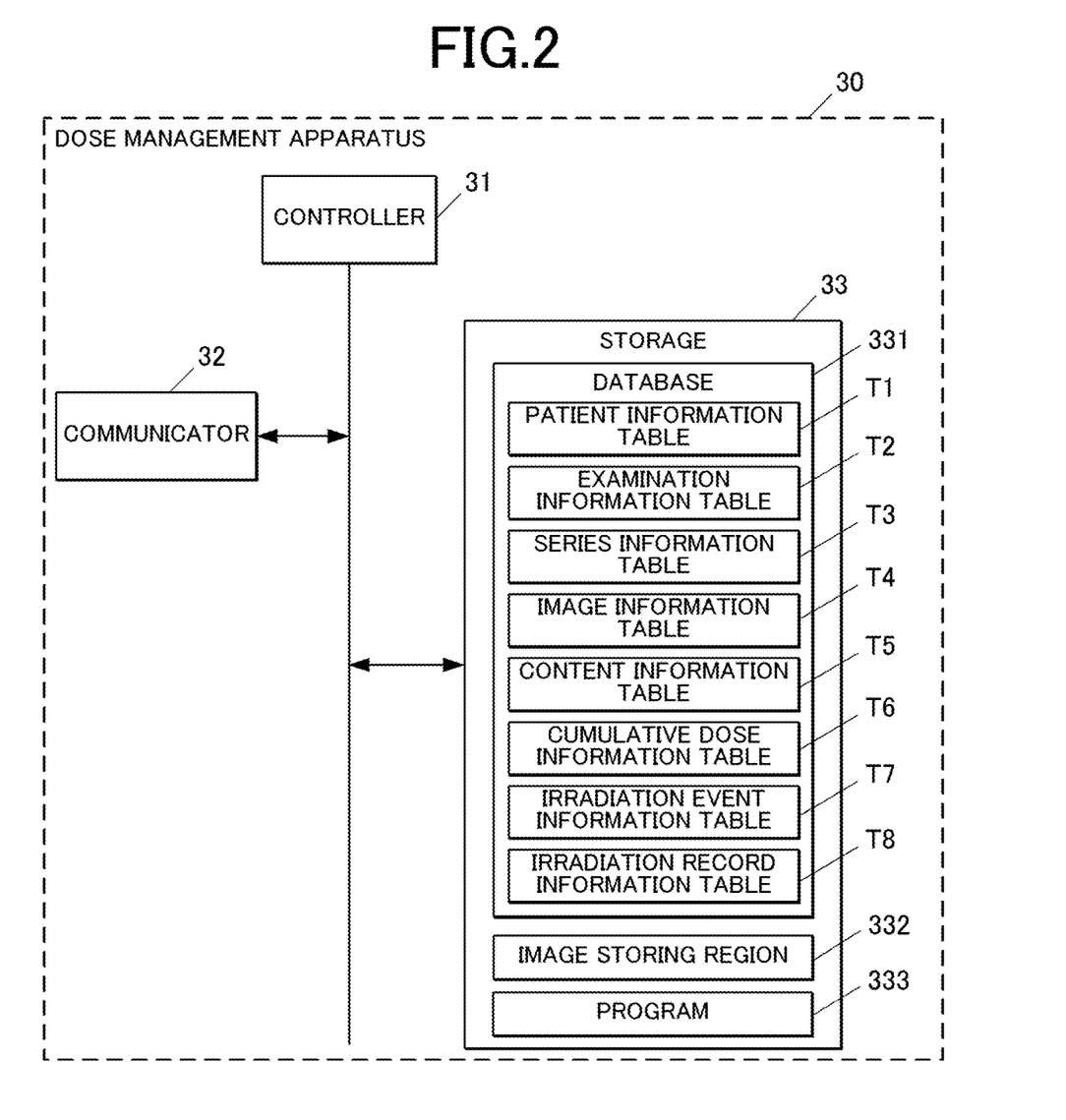
FIG. 2 is a block diagram showing a functional configuration of a dose management apparatus.

FIG. 2 is a block diagram showing a functional configuration of the dose management apparatus 30.

As illustrated in FIG. 2, the dose management apparatus 30 includes a controller 31 (a hardware processor; a computer), a communicator (or communication interface) 32, and a storage 33, which are connected by a bus.

The controller 31 includes a central processing unit (CPU), a read only memory (ROM), a random access memory (RAM), and comprehensively controls processing operation of each component of the dose management apparatus 30. Specifically, the CPU reads instructions including a program 333 stored in the storage 33, loads the instructions to the RAM, and executes various processes in accordance with the instructions.

The communicator 32 includes a network interface, and transmits and receives data to and from external apparatuses connected via the communication network N. For example, the communicator 32 receives the image data of radiographs obtained by radiographing the patient, and the RDSR, from the examination apparatus 10. The communicator 32 may receive the image data of the radiograph, and the RDSR, from the medical image storing apparatus 20.

The storage 33 includes a hard disk drive (HDD), and a non-volatile semiconductor memory, and store various data items.

For example, the storage 33 includes a database 331, and an image storing region 332.

The storage 33 stores instructions including the program 333. Note that the instructions may be stored in the ROM of the controller 31.

The database 331 stores supplementary information on the radiographs stored in the image storing region 332, and irradiation event information pertaining to each examination (information related to the radiation dose and the like) in a searchable manner.

Figure 3:
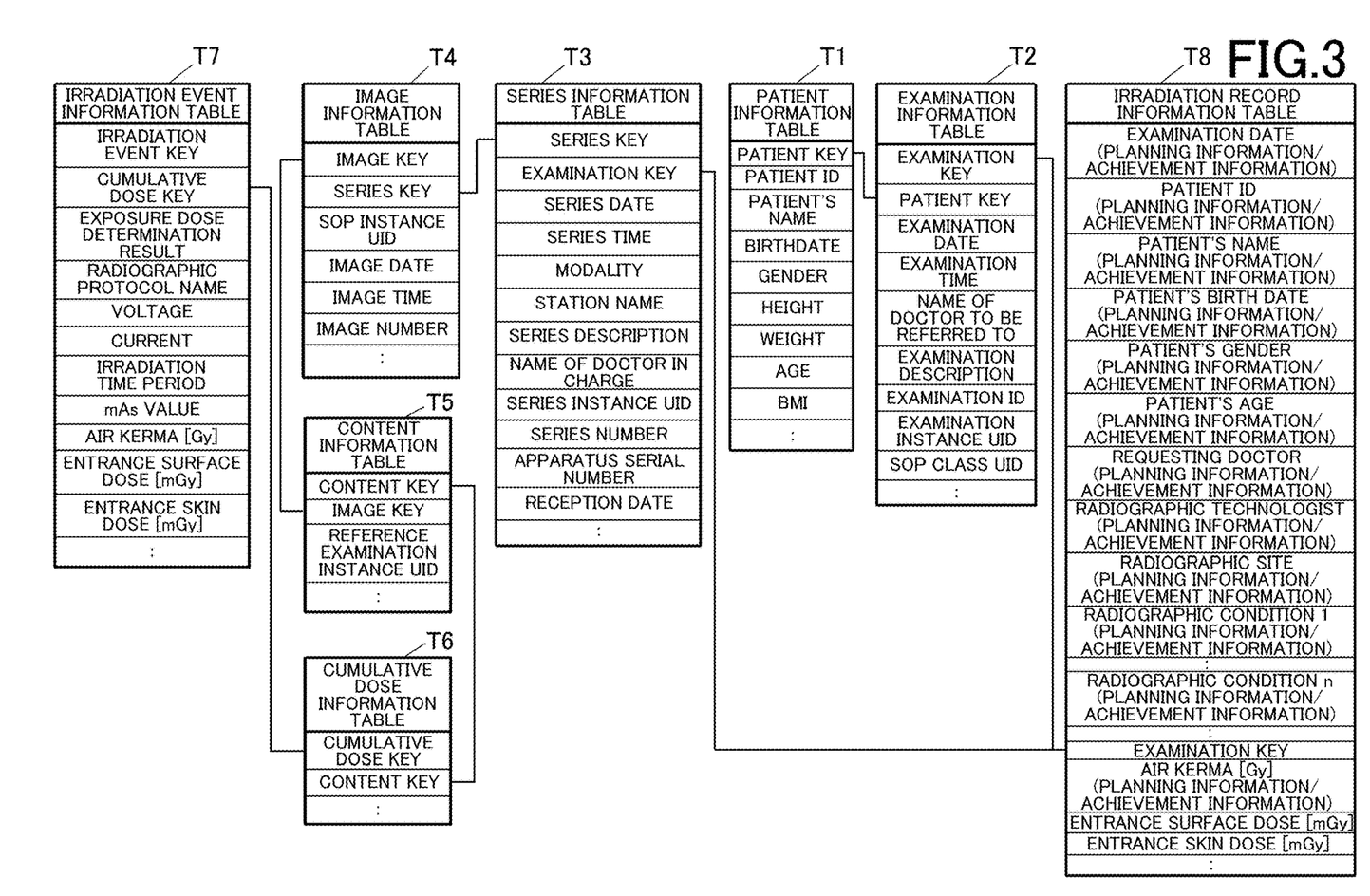
FIG. 3 shows a data configuration of a database.

FIG. 3 shows a data configuration of the database 331. The database 331 includes a patient information table T1, an examination information table T2, a series information table T3, an image information table T4, a content information table T5, a cumulative dose information table T6, an irradiation event information table T7, and an irradiation record information table T8.

The patient information table T1 stores information pertaining to patients. The information in the patient information table T1 is mainly information obtained from the RDSR, and is complemented from the supplementary information accompanying the radiograph as required in some cases.

In the patient information table T1, a patient ID, a patient's name, a birth date, a gender, a height, a weight, an age, a BMI and the like are associated with each other, with a patient key being adopted as a primary key.

The examination information table T2 stores information pertaining to examinations. The information in the examination information table T2 is mainly information obtained from the RDSR, and is complemented from the supplementary information accompanying the radiograph as required in some cases.

In the examination information table T2, a patient key associated with the patient to be examined, an examination date, an examination time, a name of a doctor to be referred to, an examination description, an examination ID, an examination instance UID, an SOP class UID and the like are associated with each other, with an examination key being adopted as a primary key.

The series information table T3 stores information about a series of pieces of supplementary information accompanying radiographs.

In the series information table T3, the examination key associated with the examination to which the series belongs, a series date, a series time, a modality, a station name, a series description, a name of a doctor in charge, a series instance UID, a series number, an apparatus serial number, a reception time and date and the like are associated with each other, with a series key being adopted as a primary key. The reception time and date is the time and date when image data of radiographs belonging to the series was received.

The image information table T4 stores information that is about an image and is supplementary information accompanying radiographs.

In the image information table T4, a series key associated with the series to which the image belongs, an SOP instance UID, an image date, an image time, an image number and the like are associated with each other, with an image key being adopted as a primary key.

The content information table T5 stores information pertaining to the examination apparatus 10.

In the content information table T5, the image key associated with the image generated by the examination apparatus 10, a reference examination instance UID and the like are associated with each other, with a content key being adopted as a primary key.

The reference examination instance UID is identification information for identifying an examination if the examination instance UID included in the RDSR is different from the examination instance UID related to the image of the radiograph generated by the examination apparatus 10; its uniqueness is secured by the DICOM standard.

The cumulative dose information table T6 stores information about the cumulative dose that is the total of air kerma at all radiographic sites in units of irradiation events.

In the cumulative dose information table T6, the content key associated with the examination apparatus 10 having performed the examination is associated, with a cumulative dose key being adopted as a primary key.

The irradiation event information table T7 stores information caused in an examination on an irradiation-by-irradiation basis (irradiation event information).

In the irradiation event information table T7, the cumulative dose key associated with the irradiation event, an exposure dose determination result, a radiographic protocol name, a voltage, a current, an irradiation time period, an mAs value (current-time product), air kerma [Gy], entrance surface dose [mGy], entrance skin dose [mGy] and the like are associated with each other, with an irradiation event key being adopted as a primary key.

The exposure dose determination result is a determination result of whether the exposure dose of the patient has a problem or not. If the exposure dose of the patient is higher than the diagnostic reference levels (DRLs) that indicate a reference value of general dose management, the determination of NG is stored. If lower than the diagnostic reference levels, the determination of OK is stored. The determination of the exposure dose may be made by a radiographic technologist, or by the controller 31 of the dose management apparatus 30.

When it is assumed that the patient is at the irradiation position of the examination apparatus 10, and a radiation dose required in this case is output from the examination apparatus 10, the air kerma is an air absorbed dose at the skin surface position. The air kerma includes no backscatter from the patient.

The entrance surface dose is an air absorbed dose that includes the backscatter at the skin surface position of the patient.

The entrance skin dose is an absorbed dose that includes backscatter radiation from the patient.

The irradiation record information table T8 stores information pertaining to an irradiation record for recording a radiographic conditions, radiographic situations and the like. The information pertaining to the irradiation record includes planning information and achievement information in the information related to the radiation dose of radiation emitted to the examination object.

The planning information in the information related to the radiation dose is, for example, scheduled information (information at the time of planning of the examination) on the examination time and date when the patient is irradiated with radiation and radiography is performed, patient's name, patient's age, requesting doctor's name, radiographic conditions, air kerma (a scheduled dose to be emitted in radiography) and the like.

The achievement information in the information related to the radiation dose is, for example, information on the examination time and date when the patient was irradiated with radiation and radiography was performed, patient's name, patient's age, requesting doctor's name, radiographic conditions, air kerma (an actual radiation dose in radiography) and the like, and is information at the examination end time.

In the irradiation record information table T8, the examination date in each of the planning information and the achievement information, patient ID, patient's name, patient's birth date, patient's gender, patient's age, requesting doctor's name, radiographic technologist's name, radiographic site, radiographic conditions, air kerma [Gy] and the like are associated with each other, with the examination key being adopted as a primary key.

Furthermore, in the irradiation record information table T8, the entrance surface dose [mGy] and the entrance skin dose [mGy] based on the achievement information in the information related to the radiation dose are associated, with the examination key being adopted as a primary key.

Note that the entrance surface dose [mGy] and the entrance skin dose [mGy] are stored in the irradiation record information table T8 in a case where the examination type by the examination apparatus 10 is a fluoroscopic examination or an angiographic examination. That is, in a case where the examination type of the examination apparatus 10 is CT or CR/DX, neither the entrance surface dose [mGy] nor the entrance skin dose [mGy] is stored in the irradiation record information table T8.

As shown in FIG. 3, the examination information table T2 is associated with the patient information table T1 through the patient key.

The series information table T3 is associated with the examination information table T2 through the examination key.

The image information table T4 is associated with the series information table T3 through the series key.

The content information table T5 is associated with the image information table T4 through the image key.

The cumulative dose information table T6 is associated with the content information table T5 through the content key.

The irradiation event information table T7 is associated with the cumulative dose information table T6 through the cumulative dose key.

The irradiation record information table T8 is associated with the examination information table T2 and the series information table T3 through the examination key.

Consequently, according to the database 331, the correspondence relationship between the image information table T4 and the irradiation record information table T8, in other words, the correspondence relationship between the radiograph, and the planning information and the achievement information in the information related to the radiation dose can be obtained.

In the image storing region 332, image data of radiographs and the like are stored.

In the image storing region 332, folders are classified with respect to the date, patient, examination, and series, thus allowing high-speed access when a file is obtained. Thus, even without access to the database 331, the supplementary information accompanying the radiograph allows the folder that stores the intended radiograph, and the file of the radiograph to be identified.

The image storing region 332 stores information included in the RDSR associated with the examination, for each patient and each examination.

<1-4. Client Terminal>

Next, the client terminal 40 is described. The client terminal 40 is a computer apparatus, such as a personal computer (PC), used by a doctor. The doctor views the radiograph related to the examination, and the information related to the radiation dose, in the client terminal 40.

Figure 4:
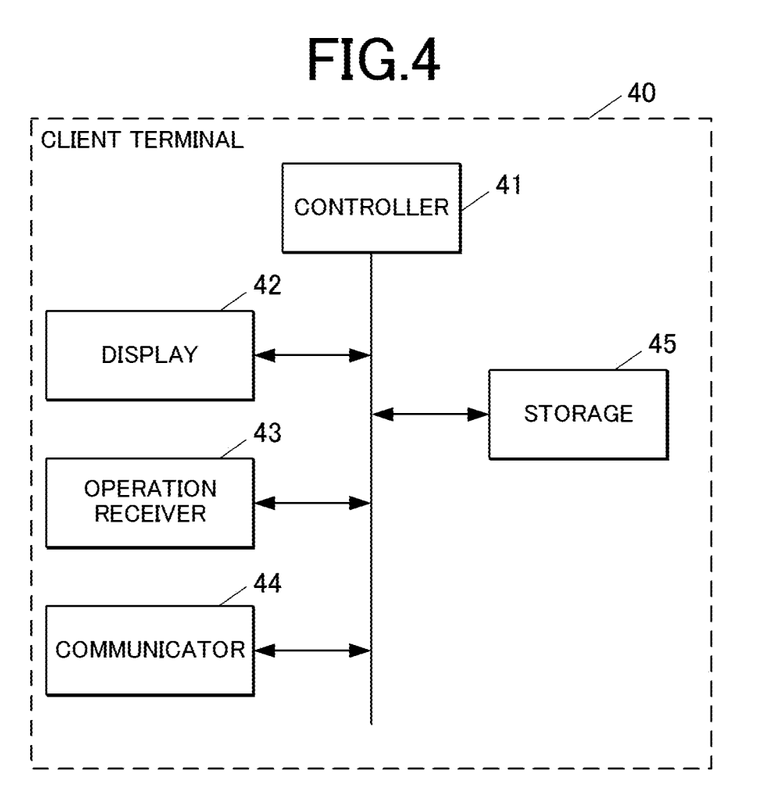
FIG. 4 is a block diagram showing a functional configuration of a client terminal.

FIG. 4 is a block diagram showing a functional configuration of the client terminal 40.

As shown in FIG. 4, the client terminal 40 includes a controller 41, a display 42, an operation receiver 43 (or user interface), a communicator (or communication interface) 44, and a storage 45, which are connected by a bus.

The controller 41 includes a CPU, a ROM, and a RAM, and comprehensively controls processing operation of each component of the client terminal 40. Specifically, the CPU reads various instructions including processing programs stored in the ROM, loads the instructions to the RAM, and executes various processes in cooperation with the instructions.

The display 42 includes a monitor, such as a liquid crystal display (LCD), and displays various screens in accordance with an instruction of a display signal input from the controller 41.

The operation receiver 43 includes a keyboard provided with a cursor key, character and numeric input keys, and various function keys, and a pointing device, such as a mouse, and outputs an operation signal input through key operation on the keyboard and mouse operation, to the controller 41. The operation receiver 43 may include a touch panel provided on a monitor of the display 42 in an overlaid manner.

The communicator 44 includes a network interface, and transmits and receives data to and from external apparatuses connected via the communication network N.

The storage 45 includes a hard disk drive (HDD), and a non-volatile semiconductor memory, and stores various data items.

<2. Operation in Medical Information Processing System>

Next, an operation of each apparatus in the medical information processing system 100 is described.

According to the medical information processing system 100, an irradiation event occurs in the examination apparatus 10, and when a radiograph is generated, image data of the radiograph, and the RDSR pertaining to the irradiation event are transmitted to the medical image storing apparatus 20 and the dose management apparatus 30.

Figure 5:
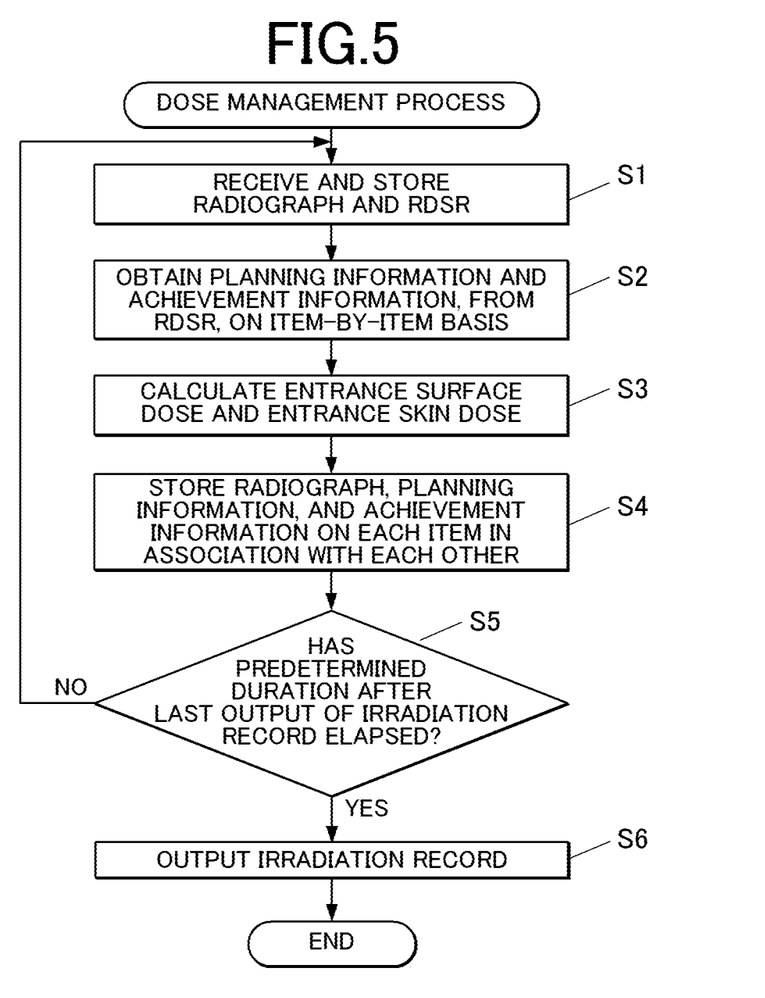
FIG. 5 is a flowchart showing control procedures of a dose management process.

In the dose management apparatus 30 among them, a dose management process shown in FIG. 5 is executed based on the received image data of radiograph and RDSR.

FIG. 5 is a flowchart showing control procedures of the dose management process by the controller 31.

When an examination is performed for a subject person in the examination apparatus 10, the image data of the radiograph and the RDSR are transmitted from the examination apparatus 10 to the dose management apparatus 30.

In the dose management process, first, the controller 31 of the dose management apparatus 30 receives the image data of the radiograph and the RDSR through the communicator 32. The controller 31 then stores the image data of the radiograph and the information included in the RDSR, in the image storing region 332 of the storage 33 (Step S1).

The controller 31 updates content of the patient information table T1, the examination information table T2, the series information table T3, the image information table T4, the content information table T5, the cumulative dose information table T6, and the irradiation event information table T7, based on the received supplementary information on the radiograph and information included in the RDSR.

Next, the controller 31 obtains the planning information and the achievement information in the information related to the radiation dose, from the RDSR received in Step S1, in an item-by-item basis (Step S2). That is, the controller 31 obtains the achievement information in the information related to the radiation dose of radiation emitted to the patient (examination object), from the DICOM structured report (here, the RDSR). Here, the controller 31 functions as a first obtainer. This Step S2 is an obtaining step.

The item obtained in Step S2 has been preset. The planning information and the achievement information are obtained with respect to the same item.

The controller 31 may obtain the planning information and the achievement information in the information related to the radiation dose, from a DICOM structured report other than the RDSR.

Figure 6:
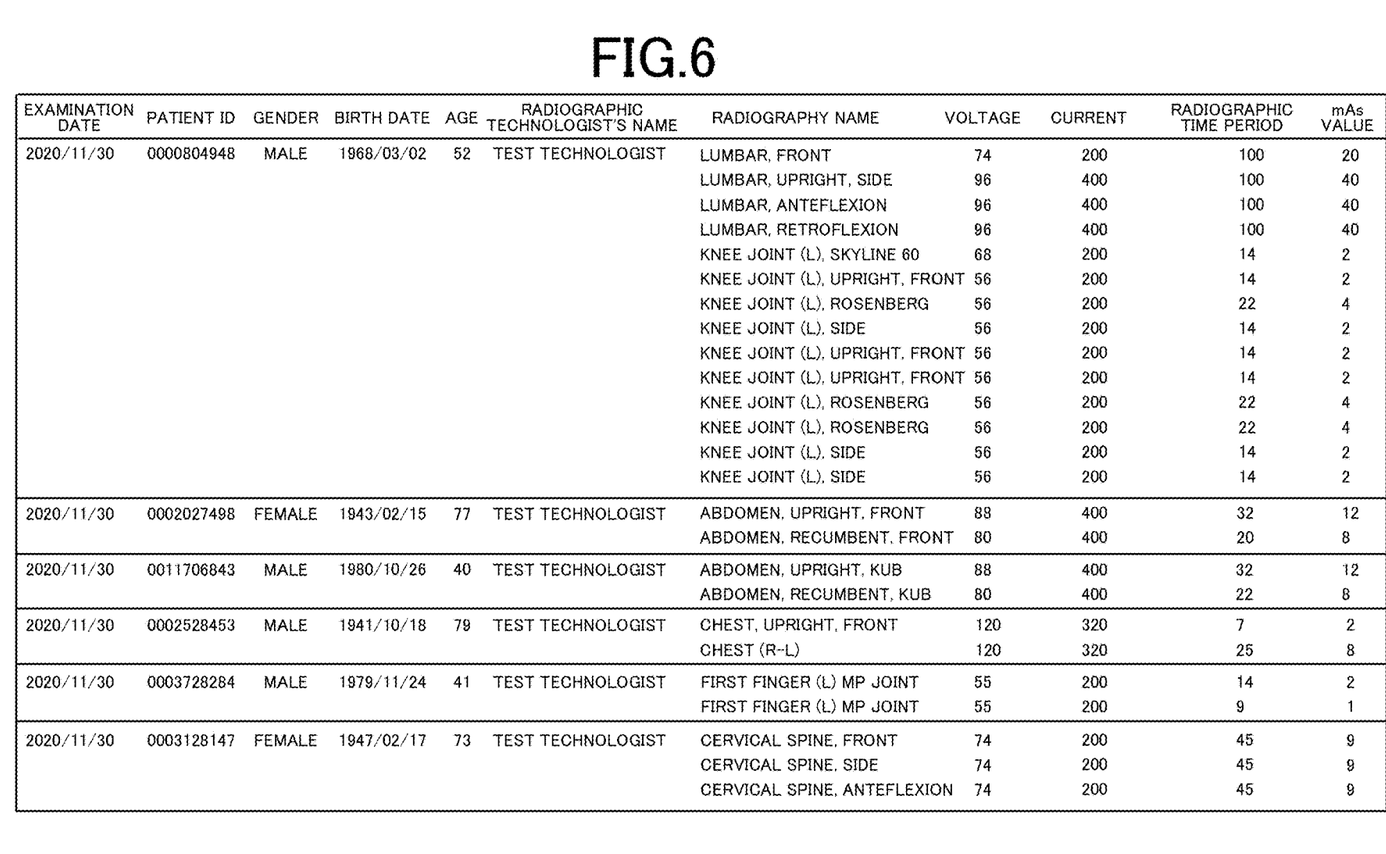
FIG. 6 shows an example of achievement information in information related to a radiation dose.

FIG. 6 shows an example of the achievement information in the obtained information related to the radiation dose.

In the example shown in FIG. 6, the items of the achievement information obtained in Step S2 are the examination date, patient ID, patient's gender, patient's birth date, patient's age, radiographic technologist's name, radiography name (radiographic site, and radiographic direction), and radiographic conditions (tube voltage value, tube current value, radiographic time period, and mAs value).

Next, if the examination corresponding to the information related to the radiation dose included in the RDSR received in Step S1 is a fluoroscopic examination or an angiographic examination, the controller 31 calculates the entrance surface dose and the entrance skin dose (Step S3). Specifically, the controller 31 calculates the entrance surface dose (ESD1 [mGy]) according to the following Expression (1), based on the air kerma (ID [Gy]) as the achievement information. Furthermore, the controller 31 calculates the entrance skin dose (ESD1 [mGy]) according to the following Expression (2), based on the air kerma (ID [Gy]) as the achievement information.

$$ESD1 = ID \times 0.85 \times 1.3 \qquad \text{Expression (1)}$$

$$ESD2 = ID \times 0.85 \times 1.3 \times 1.06 \qquad \text{Expression (2)}$$

If the examination corresponding to the information related to the radiation dose included in the RDSR received in Step S1 is CT or CR/DX, the process of Step S3 is omitted.

Next, the controller 31 records the planning information and the achievement information in the information related to the radiation dose obtained in Step S2, in the irradiation record information table T8. Accordingly, the controller 31 associates the planning information and the achievement information in the information related to the radiation dose with each other.

Furthermore, if Step S3 is executed, the controller 31 records the entrance surface dose and the entrance skin dose calculated in Step S3, in the irradiation record information table T8.

As described above, the image information table T4 and the irradiation record information table T8 are associated with each other. That is, each radiograph is associated with the planning information and the achievement information in the information related to the radiation dose. That is, by updating the content of the image information table T4 based on the received supplementary information on the radiograph, and recording the obtained planning information and achievement information in the information related to the radiation dose, in the irradiation record information table T8, the controller 31 stores the planning information, and the achievement information in the information related to the radiation dose, and the radiograph (medical image) related to the achievement information, in association with each other (Step S4). Here, the controller 31 functions as an associator.

Next, the controller 31 determines whether a predetermined time duration after output of the irradiation record has elapsed or not (Step S5).

The predetermined time duration is a preset time duration, and is, for example, a week, a month or the like.

If the predetermined time duration has not elapsed after the last output of the irradiation record (Step S5: NO), the controller 31 causes the processing to transition to Step S1.

On the other hand, if the predetermined time duration has elapsed after the last output of the irradiation record (Step S5: YES), the controller 31 outputs the irradiation record including the achievement information and the like in the information related to the radiation dose stored in Step S4 after the last output of the irradiation record until now (Step S6), and finishes the processing. That is, the controller 31 outputs, as the irradiation record, information on the achievement information in the information related to the radiation dose. Here, the controller 31 functions as an outputter. This Step S6 is an output step.

Note that the irradiation record may include not only the achievement information in the information related to the radiation dose, but also the planning information in the information related to the radiation dose, the radiograph related to the achievement information, and the entrance surface dose and the entrance skin dose calculated in Step S3.

Figure 7:
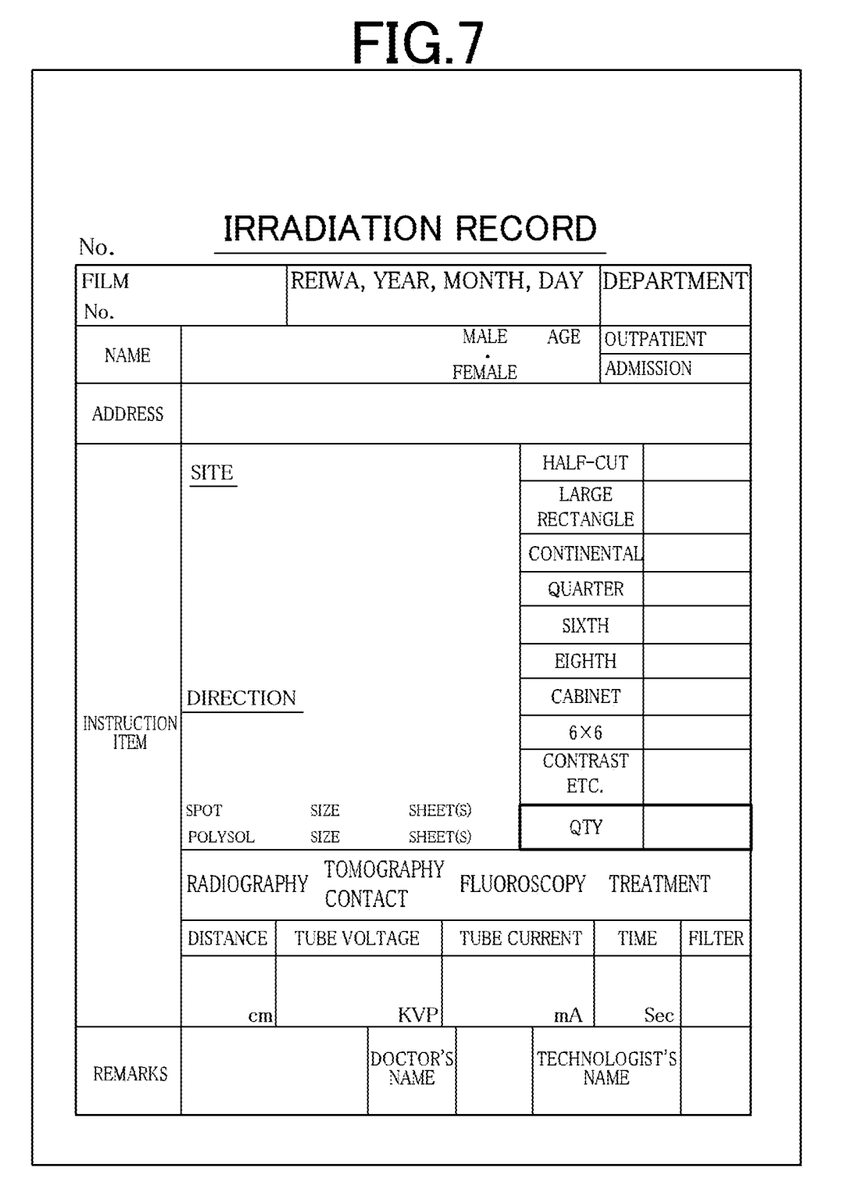
FIG. 7 shows an example of a format of an irradiation record.

As output of the irradiation record, the controller 31 causes the display 42 of the client terminal 40 to display a screen on which the irradiation record is displayed, for example. The irradiation record includes, for example, the achievement information and the like that is in the information related to the radiation dose stored in Step S4 and is written in a format of an irradiation record shown in FIG. 7.

The irradiation record may be a list form one where information is described on an item-by-item basis as shown in FIG. 6.

The irradiation record may be output in a format of PDF (portable document format), Microsoft Excel® or the like.

Figure 8:
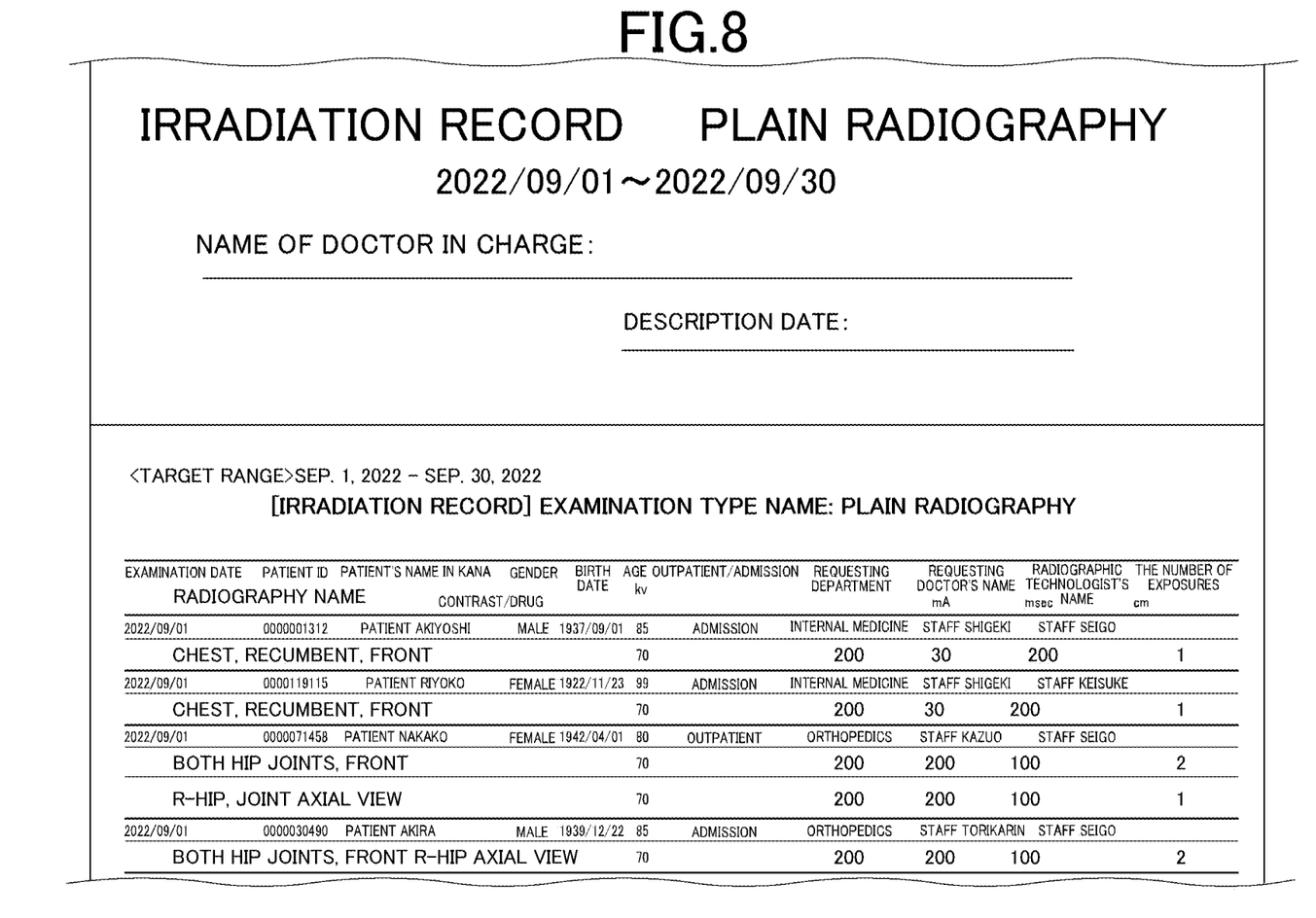
FIG. 8 shows an example of an irradiation record printed on a paper medium.

As output of the irradiation record, the controller 31 may print the irradiation record on a paper medium. In this case, the controller 31 prints the irradiation record in the format of PDF, Microsoft Excel or the like. FIG. 8 shows an example of the irradiation record printed on a paper medium.

Figure 9:
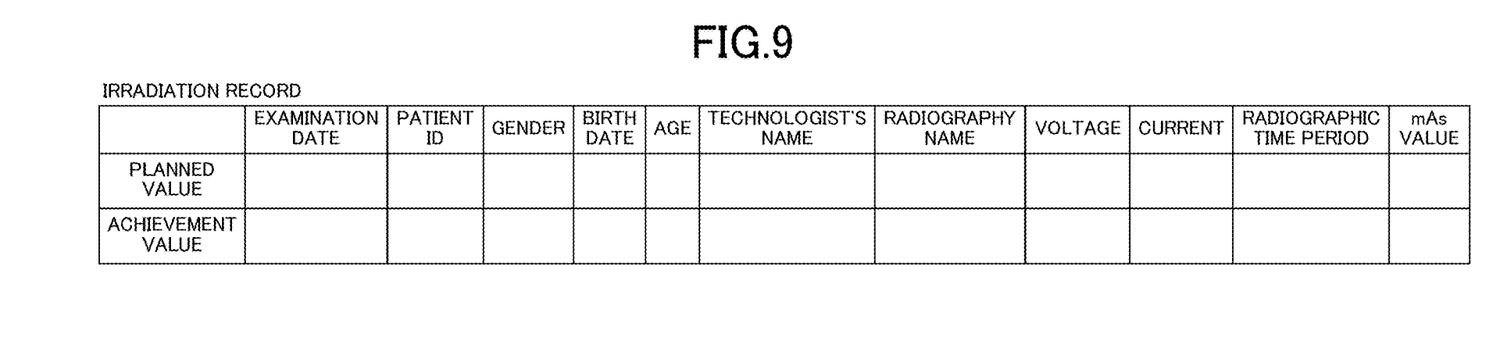
FIG. 9 shows an example of an irradiation record.

If the controller 31 outputs the irradiation record including the associated planning information and achievement information in the information related to the radiation dose as shown in FIG. 9 in Step S6, a user can compare the planning information and the achievement information in the information related to the radiation dose with each other. If comparison between the planning information and the achievement information in the information related to the radiation dose indicates presence of an examination including radiography departing from the plan, the user can grasp this examination.

A case is described where in Step S6 the controller 31 outputs the irradiation record including the planning information and the achievement information in the information related to the radiation dose, and the radiograph related to the achievement information, which are associated with each other. In this case, if comparison between the planning information and the achievement information in the information related to the radiation dose indicates presence of an examination including radiography departing from the plan, the user can grasp and verify the radiograph taken in the examination.

The achievement information obtained in Step S2 and output in Step S6 may include the achievement information on the X-ray tube current, total air kerma, and total dose-area product. The information on the X-ray tube current, the total air kerma, and the total dose-area product is not included in the DICOM Modality Performed Procedure Step (MPPS). Accordingly, by executing the dose management process, the irradiation record including the achievement information that is on the X-ray tube current, the total air kerma, and the total dose-area product and is not included in the MPPS can be output. Consequently, the user can grasp more achievement information in the information related to the radiation dose.

The achievement information obtained in Step S2 and output in Step S6 may include achievement information on DLP in a CT examination. The information on DLP is information included only in the RDSR. Consequently, by executing the dose management process described above, the irradiation record including the achievement information on DLP can be output. Consequently, the user can grasp more achievement information in the information related to the radiation dose.

As described above, in the RDSR, the information related to the radiation dose is managed on an examination-by-examination basis. Consequently, in Step S2, the controller 31 can collectively obtain the planning information and the achievement information in the information related to the radiation dose, from the RDSR, on an examination-by-examination basis. On the other hand, when the information related to the radiation dose is obtained from attribute information on the DICOM image, it is required to verify all the radiographed images, and obtain information related to the radiation dose as a target. Consequently, by executing the dose management process described above, the information related to the radiation dose can be more easily grasped than the case of obtaining the information related to the radiation dose from the attribute information on the DICOM image.

The RDSR also includes information related to the radiation dose in the case of a radiographic error. Consequently, in Step S2, the controller 31 may obtain, from the RDSR, the planning information and the achievement information in the information related to the radiation dose in the case of a radiographic error. Meanwhile, in the case of a radiographic error, no attribute information on the DICOM image can be obtained. Consequently, by executing the dose management process described above, the information related to the radiation dose can be advantageously grasped even in the case of a radiographic error, in comparison with the case of obtaining the information related to the radiation dose from the attribute information on the DICOM image.

By outputting the irradiation record for every predetermined time duration as described above, output management of the irradiation record can be easily performed. In a case of printing the irradiation record on a paper medium for every predetermined time duration, the number of paper media can be reduced in comparison with a case of printing for every irradiation event.

Note that the above description of the dose management process is about the case in which the dose management apparatus 30 receives the radiograph and the RDSR from the examination apparatus 10. Alternatively, the dose management apparatus 30 may receive the radiograph and the RDSR from the medical image storing apparatus 20. The times of receiving the radiograph and the RDSR from the examination apparatus 10 or the medical image storing apparatus 20 are not necessarily the same.

Figure 10:
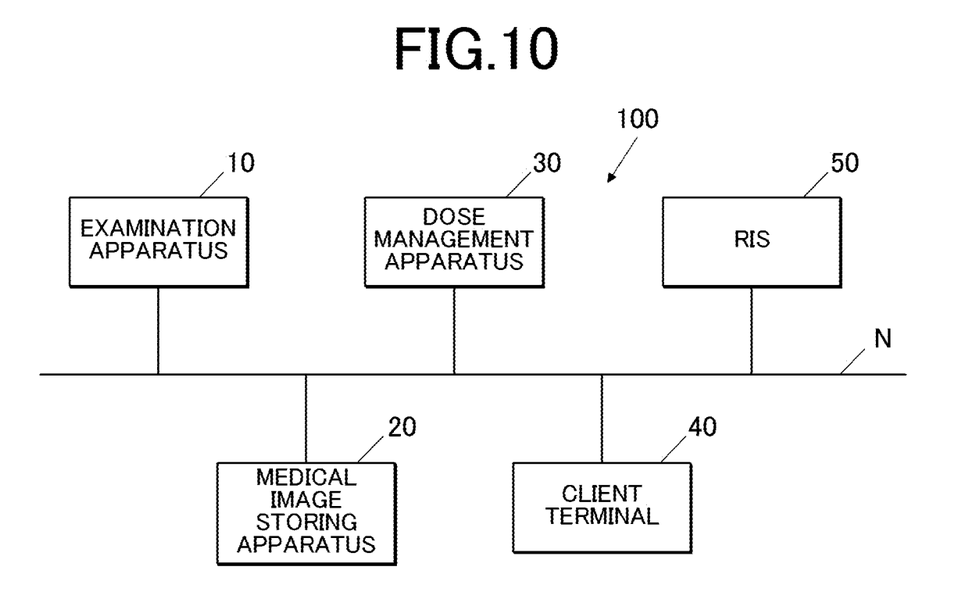
FIG. 10 shows a system configuration example of a medical information processing system.

As shown in FIG. 10, the medical information processing system 100 includes an RIS 50 connected to allow data transmission and reception via the communication network N. In this case, the controller 31 can receive the DICOM MPPS from the RIS 50. Here, the controller 31 functions as a second obtainer. Also in this case, the controller 31 obtains, from the RDSR, the achievement information in the information related to the radiation dose of radiation emitted to the examination object.

Note that the controller 31 may obtain, from the RIS 50, the planning information in the information related to the radiation dose.

<3. Technical Improvements>

As described above, the medical information processing apparatus (dose management apparatus 30) included in the medical information processing system 100 according to one or more embodiments includes: the first obtainer (controller 31) that obtains the achievement information in the information related to the radiation dose of radiation emitted to the examination object (patient) from the DICOM structured report (DICOM-SR); and an outputter (controller 31) that outputs the information on the achievement information as the irradiation record.

Accordingly, the achievement information that includes the information on the dose of actual irradiation to the examination object can be output as the irradiation record. Consequently, also with a simple system that includes no RIS, the information related to the dose of actual irradiation can be appropriately grasped. Therefore, the cost of introducing the RIS into the system can be reduced.

In the medical information processing apparatus (dose management apparatus 30), the first obtainer obtains the achievement information from the radiation dose structured report.

Consequently, even with the simple system that includes no RIS, the achievement information can be obtained from the RDSR transmitted from the examination apparatus 10 or the like.

In the medical information processing apparatus (dose management apparatus 30), the first obtainer obtains the planning information in the information related to the radiation dose, from the DICOM structured report or the radiology information system (RIS).

The medical information processing apparatus (dose management apparatus 30) includes the associator (controller 31) that associates the planning information with the achievement information.

Consequently, in the case of outputting the irradiation record including the associated planning information and achievement information in the information related to the radiation dose, the user can compare the planning information and the achievement information in the information related to the radiation dose with each other. If there is an examination including radiography departing from the plan, the user can grasp the examination by performing the comparison.

The medical information processing apparatus (dose management apparatus 30) includes the associator (controller 31) that associates the planning information, the achievement information, and the medical image (radiograph) related to the achievement information with each other.

Consequently, in the case of outputting the irradiation record including the associated planning information, and achievement information in the information related to the radiation dose, and the associated radiograph related to the achievement information, the user can compare the planning information and the achievement information in the information related to the radiation dose with each other. If there is an examination including radiography departing from the plan, the user can grasp and verify the radiograph taken in the examination by performing the comparison.

In the medical information processing apparatus (dose management apparatus 30), the first obtainer obtains, as the achievement information, at least one of pieces of information on the examination time and date, name of the examination object, age of the examination object, radiographic conditions, and actual radiation dose in the radiography in an examination in which the examination object has been irradiated with radiation and radiography has been performed.

In the medical information processing apparatus (dose management apparatus 30), the outputter outputs the irradiation record including at least one of pieces of information on the examination time and date, name of the examination object, age of the examination object, radiographic conditions, and actual radiation dose in the radiography in an examination in which the examination object has been irradiated with radiation and radiography has been performed.

Accordingly, the user can grasp the examination time and date, name of the examination object, age of the examination object, radiographic conditions, information on the actual radiation dose in radiography, and the like, as the achievement information.

In the medical information processing apparatus (dose management apparatus 30), the outputter automatically outputs the irradiation record, based on the achievement information obtained by the first obtainer.

Consequently, the user's effort of an instruction for outputting the irradiation record can be reduced. Output of the irradiation record can be prevented from being forgotten.

In the medical information processing apparatus (dose management apparatus 30), the outputter outputs the irradiation record for every predetermined time duration.

Consequently, irradiation record output management can be easily performed. In a case of printing the irradiation record on a paper medium, the number of paper media can be reduced in comparison with the case of outputting for every irradiation event.

The medical information processing apparatus (dose management apparatus 30) includes the second obtainer (controller 31) that can obtain the DICOM MPPS.

That is, even with the configuration in which the controller 31 can obtain the MPPS, the achievement information is obtained from the RDSR without using the information included in the MPPS, and is output as the irradiation record, thus allowing the information related to the dose of actual irradiation to be appropriately grasped.

Note that the description in the aforementioned embodiments is about the example of the medical information processing system. There is no limitation to this. Detailed configurations and detailed operation of the components constituting the system can be changed as appropriate within a range not deviating from the spirit of the present invention.

For example, in the dose management process in the embodiments described above, the controller 31 outputs the irradiation record for every predetermined time duration. However, there is no limitation to this. The controller 31 may output the irradiation record at every occurrence of the irradiation event in the examination apparatus 10, i.e., every reception of the radiograph and the RDSR.

In a case where the dose management apparatus 30 is provided with the operation receiver and the display, and the user can directly operate the dose management apparatus 30, user operation may be accepted by the dose management apparatus 30. In this case, the irradiation record displaying screen, which is displayed on the display 42 of the client terminal 40 in the aforementioned embodiments, is displayed on the display of the dose management apparatus 30. In the dose management process in the embodiments described above, the controller 31 automatically outputs the irradiation record, based on the achievement information in the information related to the radiation dose. However, there is no limitation to this. The controller 31 may output the irradiation record when an instruction for outputting the irradiation record is accepted through user operation.

The medical image storing apparatus 20 may have the function of the dose management apparatus 30. In this case, the medical image storing apparatus 20 corresponds to the "medical information processing apparatus" in one or more embodiments of the present invention.

The RIS 50 may have the function of the dose management apparatus 30. In this case, the RIS 50 corresponds to the "medical information processing apparatus" in one or more embodiments of the present invention.

In the aforementioned embodiments, the description is made using the example in which the storage 33 of the dose management apparatus 30 is provided with the database 331 and the image storing region 332. However, there is no limitation to this. For example, a database server or the like outside of the dose management apparatus 30 may be provided with the database 331, and required data may be obtained from the database server as required. Likewise, image data of radiographs may be stored in a storage device outside of the dose management apparatus 30, and required image data may be obtained from this storage device as required.

In the database 331, the irradiation record information table T8 may include the series key, and the irradiation record information table T8 and the image information table T4 may be associated with each other through the series key. That is, each radiograph may be directly associated with the planning information and the achievement information in the information related to the radiation dose. To manage such a database 331, the RDSR may include the series instance UID for association with the radiograph.

The method of associating each radiograph with the planning information and the achievement information in the information related to the radiation dose is not limited to this. For example, table data that associates the radiograph with the planning information and the achievement information in the information related to the radiation dose may be provided separately from the database 331.

In the above description, the example where the storage 33 or the ROM is used as a computer-readable medium storing the instructions for executing each process is disclosed. However, there is no limitation to this example. As other computer-readable media, a non-volatile memory, such as a flash memory, and a portable recording medium, such as a CD-ROM, may be applied. Further, as a medium that provides data of the instructions via a communication line, a carrier wave may be applied.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A medical information processing apparatus, comprising:
    a hardware processor that:
        receives, from an examination apparatus, a digital imaging and communications in medicine structured report (DICOM-SR);
        extracts, from the DICOM-SR, examination achievement information related to a radiation dose of radiation emitted to an examination object;
        causes a client terminal to display, on a display, the examination achievement information as an irradiation record of a predetermined format; and
        determining a time period since a previous output of the irradiation record;
        upon detecting that at least one irradiation record has not output during a predetermined time duration after the previous output of the irradiation record, outputs the irradiation record of the predetermined time period all at once by printing the irradiation record on a paper medium, independent of timing of the examination achievement.

2. The medical information processing apparatus according to claim 1, wherein the hardware processor extracts the examination achievement information from a radiation dose structured report (RDSR) that is the DICOM-SR.

3. The medical information processing apparatus according to claim 1, wherein the hardware processor extracts examination planning information from the DICOM-SR or a radiology information system (RIS).

4. The medical information processing apparatus according to claim 3, wherein the hardware processor associates the examination planning information and the examination achievement information with each other.

5. The medical information processing apparatus according to claim 3, wherein the hardware processor associates the examination planning information, the examination achievement information, and a medical image related to the examination achievement information with each other.

6. The medical information processing apparatus according to claim 1, wherein
    the hardware processor obtains, as the examination achievement information, at least one of:
        information on an examination time and date in an examination in which the examination object has been irradiated with radiation and radiography has been performed;
        information on a name of the examination object;
        information on an age of the examination object;
        information on a radiographic condition; and
        information on an actual radiation dose in the radiography.

7. The medical information processing apparatus according to claim 1, wherein
    the hardware processor outputs the irradiation record that includes at least one of:
        information on an examination time and date in an examination in which the examination object has been irradiated with radiation and radiography has been performed;
        information on a name of the examination object;
        information on an age of the examination object;
        information on a radiographic condition; and
        information on an actual radiation dose in the radiography.

8. The medical information processing apparatus according to claim 1, wherein the hardware processor automatically outputs the irradiation record, based on the examination achievement information obtained by the hardware processor.

9. The medical information processing apparatus according to claim 1, wherein the hardware processor outputs the irradiation record at a predetermined time interval.

10. The medical information processing apparatus according to claim 2, wherein the hardware processor obtains a digital imaging and communications in medicine modality performed procedure step (DICOM MPPS).

11. A non-transitory computer-readable recording medium storing instructions for causing a computer of a medical information processing apparatus to:
    receive, from an examination apparatus, a digital imaging and communications in medicine structured report (DICOM-SR);
    extract, from the DICOM-SR, examination achievement information related to a radiation dose of radiation emitted to an examination object;
    cause a client terminal to display, on a display, the examination achievement information as an irradiation record of a predetermined format, and
    determine a time period since a previous output of the irradiation record;
    upon detecting that at least one irradiation record has not output during a predetermined time duration after the previous output of the irradiation record, output the irradiation record of the predetermined time period all at once by printing the irradiation record on a paper medium, independent of timing of the examination achievement.

12. The recording medium according to claim 11, wherein the instructions cause the computer to extract the examination achievement information from a radiation dose structured report (RDSR) that is the DICOM-SR.

13. The recording medium according to claim 11, wherein the instructions cause the computer to extract the examination planning information from the DICOM-SR or a radiology information system (RIS).

14. The recording medium according to claim 13, wherein the instructions cause the computer to store the examination planning information and the examination achievement information in association with each other.

15. The recording medium according to claim 13, wherein the instructions cause the computer to associate the examination planning information, the examination achievement information, and a medical image related to the examination achievement information with each other.

16. The recording medium according to claim 11, wherein
    the instructions cause the computer to obtain, as the examination achievement information, at least one of:
        information on an examination time and date in an examination in which the examination object has been irradiated with radiation and radiography has been performed;
        information on a name of the examination object;

information on an age of the examination object;
information on a radiographic condition; and
information on an actual radiation dose in the radiography.

17. The recording medium according to claim 11, wherein the instructions cause the computer to output the irradiation record that includes at least one of:
   information on an examination time and date in an examination in which the examination object has been irradiated with radiation and radiography has been performed;
   information on a name of the examination object;
   information on an age of the examination object;
   information on a radiographic condition; and
   information on an actual radiation dose in the radiography.

18. The recording medium according to claim 11, wherein the instructions cause the computer to automatically output the irradiation record, based on the examination achievement information obtained by the computer.

19. The recording medium according to claim 11, wherein the instructions cause the computer to output the irradiation record at a predetermined time interval.

20. The recording medium according to claim 12, wherein the instructions cause the computer to obtain a digital imaging and communications in medicine modality performed procedure step (DICOM MPPS).

21. A medical information processing system, comprising a hardware processor that:
   receives, from an examination apparatus, a digital imaging and communications in medicine structured report (DICOM-SR);
   extracts, from the DICOM-SR, examination achievement information related to a radiation dose of radiation emitted to an examination object;
   causes a client terminal to display, on a display, the examination achievement information as an irradiation record of a predetermined format, and
   determines a time period since a previous output of the irradiation record;
   upon detecting that at least one irradiation record has not output during a predetermined time duration after the previous output of the irradiation record, outputs the irradiation record of the predetermined time period all at once by printing the irradiation record on a paper medium, independent of timing of the examination achievement.

22. A medical information processing method, causing a hardware processing apparatus to:
   receive, from an examination apparatus, a digital imaging and communications in medicine structured report (DICOM-SR);
   extract, from the DICOM-SR, examination achievement information related to a radiation dose of radiation emitted to an examination object;
   cause a client terminal to display, on a display, the examination achievement information as an irradiation record of a predetermined format, and
   determine a time period since a previous output of the irradiation record;
   upon detecting that at least one irradiation record has not output during a predetermined time duration after the previous output of the irradiation record, output the irradiation record of the predetermined time period all at once by printing the irradiation record on a paper medium, independent of timing of the examination achievement.

* * * * *